United States Patent [19]

Witman

[11] Patent Number: 4,983,466
[45] Date of Patent: Jan. 8, 1991

[54] STAIN AND SCRATCH RESISTANT WEAR LAYER
[75] Inventor: Jack H. Witman, Lancaster, Pa.
[73] Assignee: Armstrong World Industries, Inc., Lancaster, Pa.
[21] Appl. No.: 296,009
[22] Filed: Jan. 12, 1989
[51] Int. Cl.⁵ .............................................. B32B 27/06
[52] U.S. Cl. ................................. 428/483; 428/518; 428/524; 428/908.8; 525/54.21
[58] Field of Search ............ 428/483, 195, 524, 518, 428/908.8; 525/54.21

[56] References Cited

U.S. PATENT DOCUMENTS

| 3,198,682 | 8/1965 | Hassel et al. | 156/298 |
| 3,778,291 | 12/1973 | Elliott et al. | 117/21 |
| 3,806,478 | 4/1974 | Mansour et al. | 260/17 A |
| 3,868,338 | 2/1975 | Parsons et al. | 260/15 |
| 4,017,556 | 4/1977 | Wang | 260/856 |
| 4,423,100 | 12/1983 | Witman | 428/42 |
| 4,539,349 | 9/1985 | Blount et al. | 523/509 |
| 4,714,657 | 12/1987 | Quinn et al. | 428/412 |
| 4,781,987 | 11/1988 | Bolgiano | 428/424.6 |
| 4,935,286 | 6/1990 | Witman | 428/518 |

FOREIGN PATENT DOCUMENTS

| 490171 | 2/1953 | Canada | 525/54.21 |
| 2182337A | 5/1987 | United Kingdom . | |

*Primary Examiner*—Edith Buffalow

[57] ABSTRACT

An outermost wear layer comprising cellulose acetate propionate or butyrate, aminoplast, polyol, acid catalyst and chlorinated polyolefin releases readily from a release layer to provide improved stain and scratch resistance for vinyl surface coverings.

9 Claims, No Drawings

STAIN AND SCRATCH RESISTANT WEAR LAYER

Field of the Invention

The invention relates to polymeric protective coatings. More particularly, the invention relates to an improved wear layer for surface coverings such as flooring.

BACKGROUND OF THE INVENTION

Vinyl surface coverings are known from U.S. Pat. Nos. 3,198,682 and 3,778,291. Further it is known from British Patent No. 2,182,337 that stain and scratch resistance of vinyl surface coverings can be improved with a wear layer manufactured from melamine aminoplast, vinyl resin, polyol and acid catalyst. Similar use of melamine as a crosslinking agent in polymeric compositions is described in U.S. Pat. Nos. 4,017,556 and 4,714,657.

Uses for materials such as cellulose acetate butyrate and cellulose acetate propionate are described in patents. U.S. Pat. No. 3,806,478 describes dispersions stabilized With cellulosic materials; while U.S. Pat. No. 4,539,349 describes using peroxide present with cellulosic materials to initiate crosslinking to produce a clear polYester composition. U.S. Pat. No. 3,868,338 describes using cellulose acetate butyrate or propionate to prepare $TiO_2$ chips for use within a melamine crosslinked thermosetting composition. U.S. Pat. No. 4,423,100 describes release layer compositions containing cellulose esters such as nitrocellulose, methyl cellulose, cellulose acetate propionate and cellulose acetate butyrate which are coated on a paper carrier and do not comprise a part of a vinyl surface covering.

Cellulose acetate butyrate or propionate and chlorinated polyolefin are commercially available materials available in a variety of grades and compositions. It was not previously known to employ them in an improved wear layer according to the present invention.

SUMMARY OF THE INVENTION

An object of the invention is to provide a wear layer for vinyl surface coverings which provides improved stain and wear resistance. Such a wear layer for vinyl surface coverings is derived from:
  (a) an aminoplast,
  (b) a polyol,
  (c) an acid catalyst, and
  (d) a cellulose acetate ester.

It is a further object of the invention to provide a wear layer with improved adhesion to polypropylene coated papers, which is derived from:
  (a) a melamine resin,
  (b) a diol,
  (c) a cellulose acetate butyrate or propionate,
  (d) an acid catalyst, and
  (e) a chlorinated polyolefin.

Soil and stain resistant coatings for flooring products are produced by the steps:
  (1) applying a curable cellulose composition comprising an aminoplast, a polyol, an acid catalyst and a cellulose acetate ester on a polypropylene coated release paper,
  (2) drying and curing the composition to produce a crosslinked coating,
  (3) applying a moisture curable urethane crosslinking composition to the crosslinked coating,
  (4) drying and curing the urethane composition,
  (5) laminating the urethane composition to a flooring substrate, and
  (6) removing the release paper to expose a sheet vinyl flooring protected by a stain and scratch resistant cellulosic wear layer.

DETAILED DESCRIPTION OF THE INVENTION

Commercially available scratch and stain resistant surface coverings, manufactured according to British Patent No. 2,182,337, do not meet the full expectations of the marketplace. In particular, the wear surface of these surface coverings does not provide adequate processing latitude because of limited heat resistance. With significantly improved heat resistance without sacrificing other desirable characteristics, the present invention provides an advance using a cellulose acetate ester binder in the wear surface.

The following comparison formulations distinguish the prior art from the invention.

| Ingredient | Prior Art A | Prior Art B | Basic Invention | Improved Invention |
| --- | --- | --- | --- | --- |
| Adhesion Promoter | — | Chlorinated Polyolefin | — | Chlorinated Polyolefin |
| Resin Binder | Modified Vinyl | | Cellulose | |
| Polyol | | Diol | | |
| Crosslinker | | Melamine Aminoplast | | |
| Catalyst | | p-Toluene Sulfonic Acid | | |
| Solvent | | Ketone/Aromatic Hydrocarbon/Alcohol Blend | | |

Cellulose acetate ester binders suitable for replacement of the modified vinyl resin binder in the present invention are commercially available. In particular, cellulose acetate butyrate and cellulose acetate propionate are available from Eastman Chemical Products, Inc. This binder comprises 20% to 55% by weight of the total weight of solids in the wear surface layer composition.

Chlorinated polyolefins suitable for use as adhesion promoters within the cellulosic wear surface of the invention are also available from Eastman Chemical Products, Inc.

Effective amounts of chlorinated polyolefin adhesion promoter range from 0.25% to 5.0% by weight based on the total weight of solids in a wear layer composition. A preferred range is from 0.5 to 3% chlorinated polyolefin in the cellulose acetate butyrate or propionate wear layer. The chlorinated polyolefins are conveniently added to the cellulosic wear layer as 25% to 50% solids in toluene or xylene solutions.

The incorporation of chlorinated polyolefin within a cellulosic wear layer provides controlled adhesion/release properties from a polypropylene release paper surface. The chlorinated polyolefin level can be adjusted to avoid "pre-release" during manufacture of vinyl flooring. The following formulations in parts by weight compare a practical wear surface composition of the prior art with a preferred composition of the invention:

| | Prior Art | Invention |
| --- | --- | --- |
| Vinyl chloride/vinyl acetate copolymer | 50 | — |
| Cellulose acetate propionate | — | 32 |
| Methoxy/butoxy | 37.5 | 51 |

| | Prior Art | Invention |
|---|---|---|
| melamine resin | | |
| Cyclohexane dimethanol | 12.5 | — |
| 2,2-dimethyl-3-hydroxy-propyl2,2-dimethyl-3-hydroxypropionate | — | 17 |
| Chlorinated Polyolefin | — | 1.5 |
| p-toluene sulfonic acid | 1.5 | 2.0 |

The melamine resin present in both the prior art and invention formulations is a member of the class of aminoplasts known as hydroxyl group crosslinkers. Many of those melamine and urea-based resins or aminoplasts are commercially available such as the Cymel ® crosslinking agents from American Cyanamid Company and the Resimene ® crosslinking agents from Monsanto Company.

Useful polyols or diols which are alcohols comprising two or more alcohol groups include: 1,6-hexanediol, 1,4-cyclohexane dimethanol, glycerine, neopenyl glycol, tripropylene glycol, 1,4-butanediol, trimethylol propane, pentaerythritol and neopentyl glycol ester, etc.

The acid catalysts which may be used to catalyze the thermal curing reaction between the cellulosic resin, the aminoplast and the polyol are also well-known in the art. Examples of such catalysts are sulfonic acids, such as methanesulfonic acid and p-toluenesulfonic acid, and other acids such as citric acid, maleic acid, phthalic acid, etc. The catalysts may be used in the free acid form, but they may also be stabilized, such as by the use of an amine to neutralize the acid. Examples of such amines are ammonia, diisopropanol amine, and 2-amino-2methyl-1-propanol.

To practice the present invention, a release surface is provided for the aminoplast composition. For a very smooth surface, a polished chrome plate or a release paper coated with a polyalkylene material can be used, a particularly good example of the latter being polypropylene; useful also, for example, is polypropylene matted by calendering. The selection of such materials is well within the skill of an ordinary artisan.

On to the release paper is cast a layer of the wear surface composition. Although the component ratios of the composition will have substantial variability, the composition will usually comprise from about 4 to 1 parts of cellulose acetate butyrate or propionate for every 8 to 2 parts of the aminoplast/ polyol mixture. Further, the aminoplast/polyol mixture may comprise from about 5 to 1 parts of aminoplast for every 1 to 5 parts of polyol. Preferably, however, there will be from about 3 to 1 parts of cellulosic resin for every 2 to 4 parts of aminoplast/polyol having a ratio of from about 3 to 1 parts of aminoplast for every 1 to 3 parts of polyol.

After the aminoplast composition is applied to the release paper, it is dried and at least partially cured at about 260° F. Although it is possible to form the laminates of the present invention using partially cured aminoplast layers to obtain a high quality product, it is usually preferable to ensure that the aminoplast layer is fully cured prior to the deposition of the urethane layer.

The crosslinkable urethane wear layer coating composition may be disposed directly on the aminoplast layer after the aminoplast layer is cured. It is noted, however, that the artisan may optionally elect to pretreat the surface of the cured aminoplast layer by corona discharge or by applying a key coat composition so as to promote adhesion between the layers. The latter compositions, which typically are vinyl lacquers, are in wide use and are well-known to those skilled in the art. Such compositions often comprise vinyl chloride copolymer solution resins.

Corona discharge treatment is the preferred method to enhance adhesion, and is also well-known in the art and involves a raising of the surface energy by exposing the surface to an electrical arc. The amount of energy necessary to promote good adhesion may be readily determined by standard means. Thus, the surface tension of the coating composition may be determined according to ASTM D 1331 and the surface energy of the surface to be coated may be determined essentially as described in ASTM D 2578. The objective is to raise the surface energy of the surface to be coated such that it will be wetted by the coating composition. Ideally the surface energy resulting from the corona treatment will be at least about 10 dynes/cm greater than the surface tension of the coating composition.

The thickness of application of the cellulosic/aminoplast wear layer composition can vary from about 1 to about 8 mils, but preferably will vary from about 2.5 to about 4.5 mils. The composition may be a low solids (e.g. 40%) mixed solvent solution of cellulose acetate butyrate or propionate, aminoplast, polyol, catalyst and chlorinated polyolefin comprising sufficient hydroxyl functionality for good stain and wear resistance. Curing of the composition occurs by reaction of the aminoplast with the hydroxyl groups of the cellulosic resin and the polyol.

When fully cured materials are prepared and then laminated to produce resilient surface coverings, occasional poor adherence of the wear layer to the vinyl substrate may be encountered. It has been found desirable to avoid delamination problems by providing a key coat between the exposed surface before removing the release paper of the wear layer and the resilient layer with which it is to be interfaced. As an alternative, corona discharge treatment is also available to facilitate adhesion of the coats.

The exposed wear layer surface on the release paper is interfaced with the resilient support layer, with an intervening key coat or corona discharge treatment, and the composite material is subjected to heat and pressure to ensure firm adhesion. The composite material may also be affixed to granular or consolidated stencil vinyl products in the same manner. After consolidation is complete, the release paper is stripped from the hot sample to provide a decorative surface covering which exhibits good scratch and stain resistance. It is at this time that the incorporation of chlorinated polyolefin in the cellulosic wear layer provides the desired balance of adhesion/ease of release to permit easy stripping of the release paper from the cellulosic/aminoplast/diol stain resistant surface of the wear layer during the manufacturing process. The vinyl products so produced are resistant to staining by household items such as lipstick, mustard, shoe polish, hair dye, iodine, etc. due to the cellulosic wear layer of the invention.

The invention has industrial applicability for surface coverings and in particular for vinyl flooring. The following examples illustrate the practice of the invention.

PREPARATION A

Preferred Cellulosic Wear Layer Composition

The following ingredients in parts by weight were combined as a solvent coating composition.

| | |
|---|---|
| Cellulose acetate propionate CAP-482-0.5 from Eastman Chemical Products with 2.5% acetyl, 45% propionyl, 2.8% hydroxyl, meltin range 188-210° C. | 51.0 |
| Methylated/butylated melamine resin available as Resimene ® 755 from Monsanto Corp. | 114.8 |
| Esterdiol ® 204 from Union Carbide Corp. 2,2-dimethyl-3-hydroxypropyl-2,2-dimethyl-3-hydroxypropionate | 38.3 |
| Chlorinated pololefin available as CP-843-1 from Eastman Chemical Products as a 25% solution in xylene with 0.902 specific gravity at 25° C. | 11.9 |
| Total solvent comprising toluene, isopropyl alcohol, methyl isobutyl ketone and denatured alcohol | 201.8 |
| p-toluene sulfonic acid (added just before use) | 5.4 |

PREPARATION B

Test Cellulosic Wear Layer Composition

The following ingredients in parts by weight were combined as a solvent coating composition.

| | |
|---|---|
| Cellulose acetate butyrate CAB-551-0.2 from Eastman Chemical Products with 2.0% acetyl, 52% butyryl, 1.8% hydroxyl, melting range 130-140° C. | 94.20 |
| Resimene ® 755 | 188.82 |
| Esterdiol ® 204 (50% in isopropanol) | 125.92 |
| polyolefin (25% in xylene) | 20.15 |
| Uvitex ® OB (1% in toluene) ultraviolet absorber (Ciba-Geigy) | 00.38 |
| Solvent blend MEK, toluol, denatured alcohol | 232.78 |
| p-toluenesulfonic acid (40% in isopropanol) (added just before use) | 22.03 |

PREPARATION C

Wear layers were prepared as in Preparation B except that the cellulose acetate butyrate resin binder used was CAB-381-2.0 from Eastman Chemical Products with 13% acetyl, 37% butyrate, 1.5% hydroxyl, metling range171-184° C.

PREPARATION D

Wear layers were prepared as in Preparation A except that a different chlorinated polyolefin was used, i.e. CP-515-2 also from Eastman Chemical Products.

PREPARATION E

Moisture-curable Polyurethane Coating Applications

The following components were charged into a stirred, nitrogen-purged glass reactor and heated to 70° C. for one hour. A 44.90 gram quantity of 4,4'-diisocyanato dicylohexylmethane was added dropwise over a 30 minute period of time at a rate sufficient to maintain the temperature of the mixture at 70° C. After an additional two hour period of stirring and heating at 70° C., the product was cooled.

| Component | Weight (Grams) |
|---|---|
| Polyetherdiol (Union Carbide LHT 240) | 40.80 |
| Polyetherdiol (Union Carbide LHT 112) | 14.20 |
| Xylene solvent | 110.00 |
| Toluene solvent | 46.00 |
| Dimethyltin dineodecanoate catalyst (Witco UL-28) | 0.55 |
| Surfactant (Monsanto XA-677 Multiflow) | 0.30 |
| Light stabilizer (American Cyanamid UV-5411) | 0.20 |

EXAMPLE 1

Preparation A was applied to a polypropylenecoated release paper by a reverse roll coater to provide a wet thickness of about 2.5 to 3.5 mils. The coated paper was passed through a 260° F. over such that the coating resided in the oven for four minutes.

Preparation E was then coated on the dried cellulosic wear layer to provide a 5 to 6.5 mil wet coating. The coating was dried by passing through a 250° F. oven with a seven minute dwell time.

A lamination and consolidation step for laboratory evaluations involved the use of a 12 inch x 12 inch press to prepare 9 inch x 9 inch samples. The top platen of the press was heated at 310° F. whereas the bottom platen was heated at 300° F. The dwell time in the press was 10 seconds at 250 pounds pressure, followed by 10 seconds at 1,200 pounds of pressure. Following removal of the sample from the press, the release paper was stripped from the hot sample.

Both stencil vinyl and gelled vinyl plastisol resilient support materials were used for lamination. Stain resistance was evaluated using ordinary household stains. All samples showed superior stain and good scratch resistance as compared to polyurethane coatings.

Table 1 gives comparative results of cumulative testing of the increase in coloration from iodine, hair dye, asphalt driveway sealer, shoe polish, and ink staining as well as measurement of the decrease in gloss due to scratching from traffic wheel testing.

TABLE 1

| | % Stain Increase | % Gloss Retention |
|---|---|---|
| Control (Prep. E without a wear layer) | 244 | 78 |
| Invention (Prep. E with a wear layer of Prep. A) | 89 | 58 |

While these results summarize all the different stains, the cellulosic wear layer of the invention proved significantly superior in resisting iodine, asphalt and hair dye stains.

EXAMPLE 2

Preparations B, C and D were tested in the same manner as Preparation A, and comparable results were obtained.

What is claimed is:

1. A wear layer for a vinyl surface covering derived from:
   (a) an aminoplast,
   (b) a polyol,
   (c) an acid catalyst, and
   (d) a cellulose acetate ester.
2. The wear layer of claim 1 wherein the aminoplast is a melamine.

3. The wear layer of claim 1 wherein the polyol is 2,2-dimethyl-3-hydroxypropyl-2,2-dimethyl-3-hydroxypropionate.

4. The wear layer of claim 1 wherein the ester is cellulose acetate butyrate.

5. The wear layer of claim 1 wherein the ester is cellulose acetate propionate.

6. The wear layer of claim 1 further comprising an adhesion promoting amount of a chlorinated polyolefin.

7. The wear layer of claim 1 wherein the aminoplast in a melamine and the ester is selected from the group consisting of cellulose acetate butyrate and cellulose acetate propionate.

8. A floor covering comprising the wear layer of claim 1.

9. A floor covering comprising the wear layer of claim 7.

* * * * *